(12) United States Patent
Cecchi et al.

(10) Patent No.: US 6,500,365 B1
(45) Date of Patent: Dec. 31, 2002

(54) PROCESS FOR THE MANUFACTURE OF AN OPTICAL CORE FOR A TELECOMMUNICATIONS CABLE

(75) Inventors: Feliciano Cecchi, Inveruno; Giovanni Brandi, Milan, both of (IT)

(73) Assignee: Pirelli Cavi e Sistemi S.p.A., Milan (IT)

(*) Notice: Subject to any disclaimer, the term of this patent is extended or adjusted under 35 U.S.C. 154(b) by 11 days.

(21) Appl. No.: 09/585,908

(22) Filed: Jun. 2, 2000

Related U.S. Application Data

(63) Continuation of application No. PCT/EP98/07654, filed on Nov. 27, 1998
(60) Provisional application No. 60/067,899, filed on Dec. 8, 1997.

(30) Foreign Application Priority Data

Dec. 4, 1997 (EP) .............................................. 97121295

(51) Int. Cl.$^7$ ................................................ B29D 11/00
(52) U.S. Cl. ........................ 264/1.28; 264/1.29; 425/114
(58) Field of Search ............................... 264/1.24, 1.28, 264/1.29, 171.21; 425/113, 114

(56) References Cited

U.S. PATENT DOCUMENTS

| | | | | |
|---|---|---|---|---|
| 4,221,756 A | * | 9/1980 | Piper et al. | ............ 264/171.21 |
| 4,767,183 A | * | 8/1988 | Martin | |
| 4,832,441 A | * | 5/1989 | Barnes et al. | |
| 4,902,097 A | | 2/1990 | Worthington et al. | |
| 4,910,057 A | * | 3/1990 | Ide et al. | |

FOREIGN PATENT DOCUMENTS

| | | |
|---|---|---|
| EP | 0 543 379 | 5/1993 |
| EP | 0 646 819 | 4/1995 |
| GB | 2 113 903 | 8/1983 |
| GB | 2 136 350 | 9/1984 |
| GB | 2 176 905 | 1/1987 |
| GB | 2 303 938 | 3/1997 |

\* cited by examiner

Primary Examiner—Mathieu D. Vargot
(74) Attorney, Agent, or Firm—Finnegan, Henderson, Farabow, Garrett & Dunner, LLP

(57) ABSTRACT

Optical core for a telecommunications cable comprising at least one support consisting of a central reinforcing member and a first coating layer of a thermoplastic polymer applied around the central member, a plurality of optical fibres arranged around the support and a second coating layer extruded around the support. The optical fibres, in each transverse section of the core, are arranged substantially tangential to the support and, around their remaining portion, are completely encapsulated in the second coating layer. The core can be built using a process wherein the fibres are guided inside appropriate grooves to give conditions of substantial tangency to the support as far as the zone of extrusion.

16 Claims, 5 Drawing Sheets

PROCESS FOR THE MANUFACTURE OF AN OPTICAL CORE FOR A TELECOMMUNICATIONS CABLE

This application is a continuation of International Application No. PCT/EP 98/07654, filed Nov. 27, 1998, the content of which is incorporated herein by reference. and claims the benefit of U.S. Provisional Application No. 60/067,899, filed Dec. 8, 1997, the content of which is also incorparated herein by reference.

This invention relates to a process for the manufacture of an optical telecommunications cable.

More particularly, the invention relates to a process for the manufacture of an optical core for a telecommunications cable, wherein the optical core comprises a support consisting of a central, traction-resistant reinforcing member, a first polymeric coating layer applied around the central member, a plurality of optical fibres arranged around the first layer and a second polymeric coating layer extruded around the first layer and around the optical fibres.

Numerous processes are known for the manufacture of telecommunications cables comprising a core with optical fibres where the optical fibres, typically coated with one or more layers of acrylic resin, are completely encapsulated in thermoplastic materials.

A process is known, for example, from GB patent application 2,176,905 according to which optical fibres with acrylic coatings are forced through a die together with a central reinforcing member before being encapsulated in a thermoplastic casing of a material commercially designated "Hytrelo®".

This process is known as a "one-shot operation", indicating that the core is formed in a single step in the extrusion die.

A method is described in GB patent no. 2,136,350 for constructing an optical core whereby a first central strength member is heated and a first thermoplastic elastomer layer is extruded on this member. A plurality of optical fibres is arranged in a helical pattern on the first layer with a planetary motion obtained from a special revolving cage whereon drums containing the fibres are arranged. A second layer of thermoplastic material is extruded around the fibres. This method requires particularly complex equipment, consisting of a revolving cage with which rotating drums of fibres are associated and also guides for directing the fibres from the cage to the extrusion head.

GB patent no. 2,113,903 describes a method for making a telecommunications cable according to which a plurality of optical conductors is encapsulated at least partially in the outer periphery of a central matrix of thermoplastic material, polyethylene for example, extruded around a central steel or nylon filament member. More particularly, the conductors are forced against the central member which is softened by heat. The pressure on the conductors is such that a predetermined depositing thereof takes place in the matrix by which they are kept apart from each other before being coated with a further second extrusion layer. US document no. 4,902,097 describes a method according to which a central reinforcing member is heated and provided with a first layer of thermoplastic elastomer. The support thus formed is heated and thereby softened to such an extent as to enable partial encapsulation therein of the optical fibres guided to the first layer through a plate with through-holes that the fibres pass through on their way to the extrusion head. A second layer of thermoplastic material is then extruded on the support and on the fibres. GB 2,303,938 discloses a method for producing an optical cable by disposing a plurality of fibers on the surface of an inner polymeric layer and embedding them into an outer polymeric layer. EP 646 819 discloses a method for reducing the PMD in fiber optic cable by imparting a controlled twist to the fiber being disposed around a coated strength member. During the manufacturing process, the strength member passes through a helically rotating closing die which applies radially inward forces on the cable core.--

The applicant has observed that the production of optical cores according to the known methods may result in attenuation of the fibre transmission properties, due to the stresses that the fibres are subjected to during production of the optical core.

For example, with the so-called "one shot" process, it is difficult to control the relative positions of the fibres during extrusion of the polymeric layer and the fibres are subjected to undesired and uncontrolled stresses on account of the high level of pressure exerted by the polymeric material in the extrusion head.

The Applicant has also noted that partial encapsulation of the optical fibres in a first layer of thermoplastic material extruded around a central reinforcing member and subsequently covered with a second polymeric layer, as described in GB patent 2,113,903 or U.S. Pat. No. 4,902,097, may be one of the causes of signal transmission attenuation in the fibres. In practical terms, it was seen that embedding fibres to a greater or lesser extent in a first thermoplastic layer, as described in the above patents to maintain the fibres in the desired configuration around the extrusion zone of the second layer, requires a certain mechanical compression action to be exerted on the fibres, which thus remain in the cable in a state of mechanical stress which, if high, results in attenuation of the signal. It was also observed that it is difficult to continuously keep this compression at a low level in view of the considerable lengths, running into kilometres, usually required in optical core manufacture.

The Applicant also noticed that, in the absence of a certain control over extrusion parameters, such as temperature of the molten polymer or dimension of the extruder, extrusion of the second polymeric layer onto the optical fibres arranged around the first coat may cause non-uniform distribution of pressure on the fibres, with the risk of moving the fibres from their desired configuration and of increasing attenuation of the signal when the transmission cable is in operation.

The Applicant has now found that a "tight" cable can be made simply and effectively, in which a plurality of optical fibres are encapsulated in a core of polymeric material consisting of at least two concentric and contiguous layers of polymer. This result may be conveniently obtained by arranging the fibres around a central support, so that they are free of the interface formed between the two contiguous polymeric layers and by controlling the extrusion parameters so that the geometric configuration of the fibres is maintained in a predetermined position.

Accordingly, one aspect of the present invention concerns a process for the manufacture of an optical core for a telecommunications cable, comprising at least one central support coated with a first polymeric coating layer, a plurality of optical fibres arranged longitudinally around the support and a second polymeric coating layer extruded around said first layer and around said optical fibres, which comprises the following steps:

a) arranging said optical fibres longitudinally around said first polymeric coating layer so that the optical fibres are substantially tangential to the surface of the coating and circumferentially separated from each other in a predetermined way; and b) extruding the second layer around said first layer and around said optical fibres, maintaining a condition of substantial tangency and of circumferential separation at least as far as the exit of the extruder.

In the course of this description, the phrase "condition of substantial tangency of the fibres to the support" means a configuration wherein the fibres are placed in a position such that the interface between the two polymeric layers does not cross through the fibres. This condition generally includes both the case where the fibres are placed in substantial contact with the inner polymeric layer arranged around the central support, and the condition where the fibres are totally encapsulated in the second polymeric layer, thereby placing a thin layer of the second polymeric coat between the optical fibres and the first coating layer. This substantial tangency is typically obtained without applying any particular pressure on the fibres, either radially or longitudinally, to compress the fibres against the support or encapsulating them partially in it, as for example the mechanical type compression exerted by suitable equipment or compression obtained by winding the fibre helically under tension around the support. The expression is also used to mean that the fibre is in substantially tangential contact with the support substantially in each transversal section of the optical core.

In this description, the expression "condition of predetermined circumferential separation" means that the fibres are placed at the extruder entrance at a predetermined distance from each other around the circumference of the coated central support. The "maintenance of a condition of circumferential separation" at least as far as the extruder exit point means that in any case the fibres arranged longitudinally on the support must not be touching each other at the end of the extrusion process. Ideally the distance between the fibres at the end of the extrusion process will remain substantially the same as that set on entry of the fibres into the extruder. Ideally this predetermined distance is roughly the same between one fibre and the next.

A preferred aspect of this process comprises the following steps:

a) feeding the support in a longitudinal direction towards an extruder comprising an extrusion head containing a male die and a female die, where the second layer is extruded;

b) applying a plurality of fibres to said support, guiding the fibres for a predetermined distance in said direction to obtain a condition of substantial tangency at each point of contact with said support and of predetermined relative circumferential separation;

c) extruding the second layer around said first layer and around said optical fibres, maintaining a condition of substantial tangency and relative circumferential separation of the fibres as far as the exit of the extrusion head; and d) cooling the optical core thus obtained.

According to a preferred embodiment, said extrusion head comprises a female die characterized in that it has a "land" with predetermined values for length "L" and diameter "D", such as to substantially maintain a condition of substantial tangency of the fibres to the support and of relative circumferential separation between the fibres as far as the point of exit from the zone of extrusion of the second polymeric layer. In particular, the "L/D" ratio values shall be between 1 and 2, and preferably between 1.3 and 1.5.

In this description, the term "land" of the female die is taken to mean the terminal portion of the extrusion head, typically of cylindrical shape, through which the extruded optical core is drawn.

According to a preferred aspect of this invention, said extrusion head comprises a male die characterized in that it comprises a plurality of suitable grooves arranged longitudinally along the inner wall of said male die so as to guide and maintain the optical fibres in the position of substantial tangency to the support. In particular, the grooves are arranged so that the maximum distance between two opposite grooves, close to the exit of the male die, substantially corresponds to the sum of the diameter of the support and twice the diameter of the fibres.

According to a further preferred aspect, the process is characterized in that the optical core is collected on a flywheel maintaining a ratio of the pull "K" on the support to the braking pull "k" on each fibre of between 10 and 50, the values of the said ratio being such that upon release of said pulls "K" and "k" the residual fibre elongation that must be compensated for before the fibres are subject to compression is at least about 0.02%, and preferably about 0.04%.

Again ideally the process is characterized in that the feed rate of the support is between 10 and 50 m/min.

A further aspect of this invention concerns a telecommunications cable comprising an optical core where said optical core comprises a central support coated with a first polymeric coating layer, a plurality of optical fibres arranged longitudinally around the support, and a second coating layer extruded around the support and around the optical fibres, an interface being defined between said first and said second polymeric layers, characterized in that said optical fibres are free of the interface formed between the two polymeric layers and in that said fibres are arranged in an open configuration around the support.

The term "open configuration" intended to mean typically that the fibres are arranged around the central support without a continuous type helical winding. For example, the fibres may be arranged substantially parallel to the longitudinal axis of the central support or in an open helix configuration, i.e. with inversion of the winding direction, also known as an "SZ" type helix. A parallel disposition of the fibres is generally preferred. Note that, in general, this definition includes configurations that involve absence of any substantial mechanical tightening of the fibres about the central support.

A further aspect of the present invention concerns a telecommunications cable comprising an optical core where said optical core comprises a central support coated with a first polymeric coating layer, a plurality of optical fibres arranged longitudinally around said support and a second coating layer extruded around the support and around the optical fibres, characterized in that said optical fibres have an average transmitted signal attenuation value less than a predetermined value. Ideally, the average attenuation value measured in a fibre in an optical core according to the invention is less than or equal to approximately 0.200 dB/km.

Another aspect of this invention also concerns a telecommunications cable comprising an optical core where said optical core comprises a central support coated with a first polymeric coating layer, a plurality of optical fibres arranged longitudinally around said support and a second coating layer extruded around the support and around the optical fibres, characterized in that the difference between the maximum and minimum average signal attenuation values in said fibres, measured during a thermal cycle ranging between 60° C. and −30° C., is less than a predetermined value. Ideally, the difference between the maximum and minimum average signal attenuation values in said fibres, measured during a thermal cycle ranging between 60° C. and −30° C., is less than 0.01 dB/km.

Yet another aspect of the invention is a method for minimizing attenuation of a signal transmitted by an optical fibre encapsulated in an optical core for a telecommunications cable, where the optical core comprises a central support coated with a first polymeric coating layer, a plurality of optical fibres arranged longitudinally around the support and a second coating layer extruded around the support and around the optical fibres, characterized in that said plurality. of optical fibres is arranged substantially tangentially around the support without the fibres exerting any substantial pressure on the support.

Yet a further aspect of the invention is an extruder for the manufacture of an optical core for a telecommunications cable comprising a support coated with a first polymeric coating layer, a plurality of optical fibres arranged longitudinally substantially tangentially around the support, and a second coating layer extruded around the support and around the optical fibres, said extruder comprising a male die through the axis of which the support and the fibres arranged around the latter are to be passed and a female die comprising a land through which the finished optical core is extruded, characterized in that:

a) the inner wall of the male die is provided with a plurality of longitudinal grooves adapted to receive said fibres passing through the die towards the extruder exit, the maximum distance between the walls of two diametrically opposite grooves at the die exit being substantially equal to the sum of the external diameter of the coated support and twice the diameter of a fibre, thereby ensuring a condition of substantial tangency between optical fibres and support; and b) the ratio between the length "L" and the. diameter "D" of the land of the female die is between 1 and 2.

However, a clearer understanding of the present invention will be gained from the following example of an embodiment and the accompanying figures, where:

Figure 7:
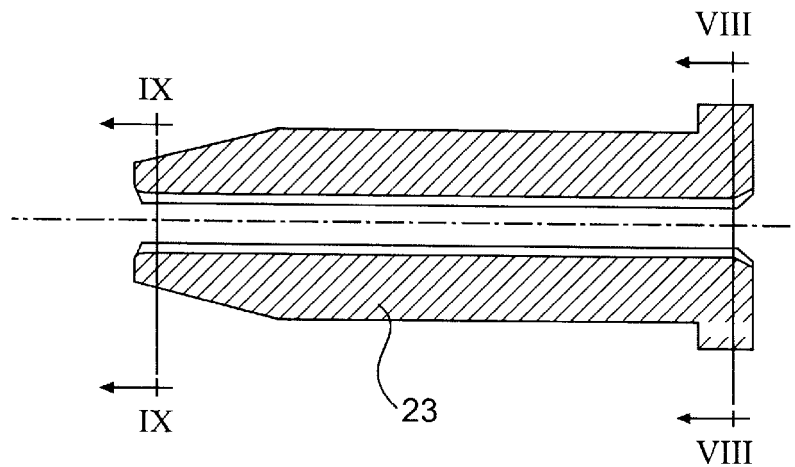
Figure 8:
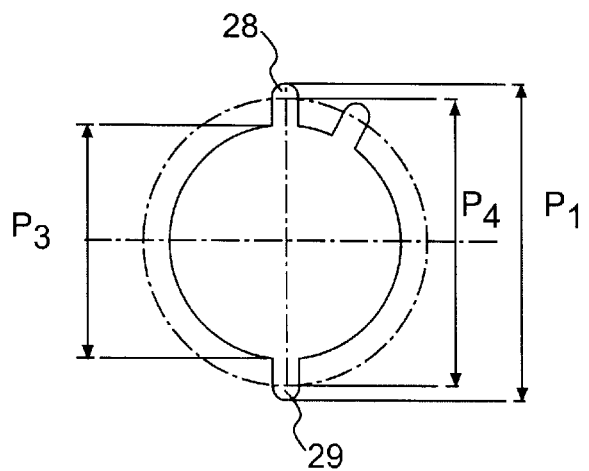
Figure 9:
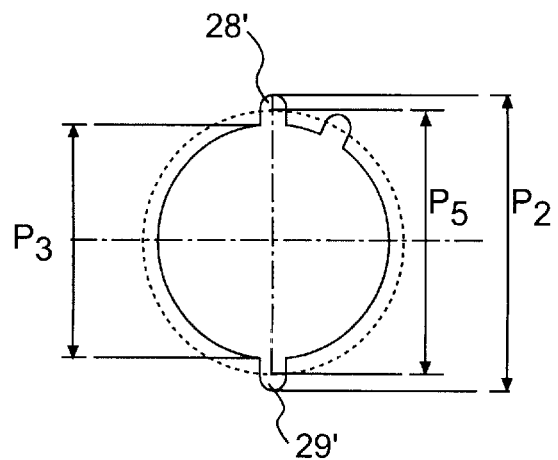

FIG. 7 shows in longitudinal partial section an enlarged view of the element 23 of the male die of the extruder head, concerning the part through which the fibres and the support are guided before extrusion of the second thermoplastic layer; and FIGS. 8 and 9 respectively depict the enlarged entrance and exit sections of the internal surface of the element 23 of the male die of FIG. 7.

Figure 1:
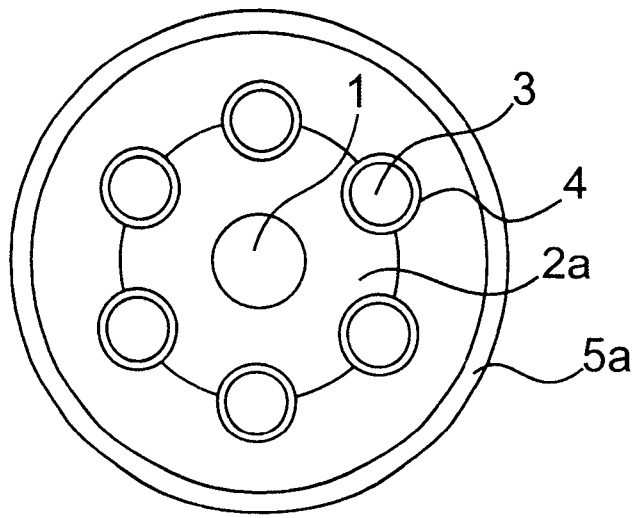
FIG. 1 shows in transverse section an optical core of a state-of-the-art telecommunications cable.

In FIG. 1, a known type optical core for a telecommunications cable, identified with the numeral 1, is depicted in transverse section.

The core comprises a central reinforcing member 1, for example a steel or similar wire, coated with a polymeric layer 2a. A plurality of optical fibres 3, each provided with its own acrylate coating layer 4 (in one or more layers), is partially encapsulated in the polymeric material 2a, as shown in FIG. 1.

Another polymeric layer 5a covers the first layer 2a and the optical fibres partially encapsulated in the said first layer.

Figure 2:
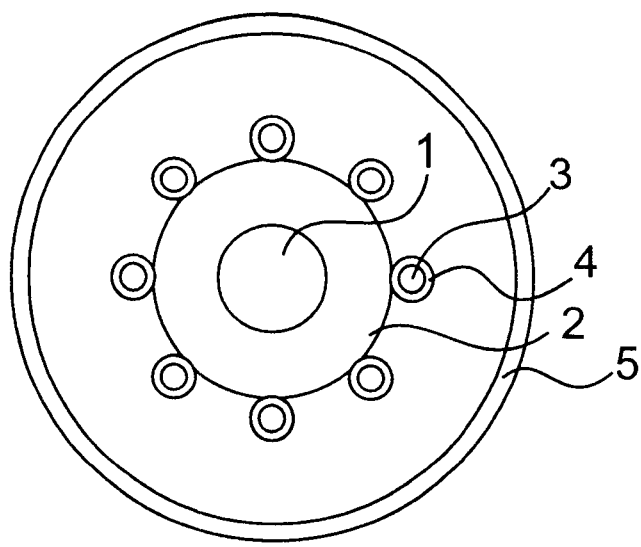
FIG. 2 illustrates in transverse section an optical core for a telecommunications cable according to this invention.

Illustrated in transverse section in FIG. 2 is an optical core according to the invention. The optical core comprises a central support, typically a central reinforcing member 1, coated with a polymeric layer 2. The central reinforcing member may, for instance, be a wire of steel or resin reinforced with glass fibres, suitable reinforcing polymeric materials (such as aromatic polyamides, for example "kevlar"®), carbon fibres or the like. Examples of polymers suitable for coating the reinforcing member are thermoplastic resins. Preferably an elastomeric polyester is used, the one marketed under the trade name Hytrel® for example, particularly Hytrel® 4056 and G3548W (Du Pont).

A plurality of optical fibres 3, with their coating layers 4 (typically of acrylic resin, in one or more layers) are arranged longitudinally around the layer 2, in a condition of substantial tangency between inner support core 6 and fibres 3, and are completely encapsulated in a second polymeric layer 5, where the polymer constituting the second layer is selected from those listed in the foregoing, preferably being the same as that used for the coating 2.

The bending modulus (measured according to the ASTM D790 standard) of the material that the inner layer 2 and the outer layer 5 are made of is preferably between 30 and 70 MPa.

The optical core according to one embodiment of the invention comprises optical fibres arranged substantially tangential to the transverse section of the core parallel to the cable axis, preferably numbering between 2 and 12, with the diameter of the fibres being between 240 and 270 pm.

According to a preferred. embodiment, the strength member consists of a steel wire with a diameter of between 0.5 and 0.7 mm, preferably of about 0.65 mm.

Preferably the thickness of the inner coating layer 2 is between 0.5 and 0.7 mm, giving an external diameter of the support 6 of between approximately 1.4 and 1.8 mm. According to a preferred embodiment, where 12 optical fibres are envisaged around the support 6, the polymeric coat is arranged around the strength member with a constant radial thickness, so that the diameter of the support 6 is roughly 1.7 mm..

The outer polymeric coat encapsulating the optical fibres is of radial thickness preferably between 0.4 and 0.8 mm, giving the optical core a final diameter of between 2.5 and 3 mm, preferably 2.75 mm.

The optical core may comprise further protective layers of a plastic material and/or in the form of thin metallic sheathes.

In a preferred embodiment, the core is surrounded by a sheath of thermoplastic material (not depicted) between 0.05 and 0.15 mm thick, for example 0.125 mm thick giving the core a total external diameter of 3.00 mm. The thermoplastic material is selected from those known in the art including, though the list is by no means exhaustive, PBT, PP, polyamides and polyethylenes.

One example of manufacture of the optical core comprises a first step in which the inner support core 6, consisting of the central reinforcing member 1 coated with the first polymeric layer 2 (for example, a thermoplastic elastomer, in particular Hytrel®), is made in known ways not depicted in the figures, for example by extruding the layer of polymeric material 2 around the support 1.

Figure 3:
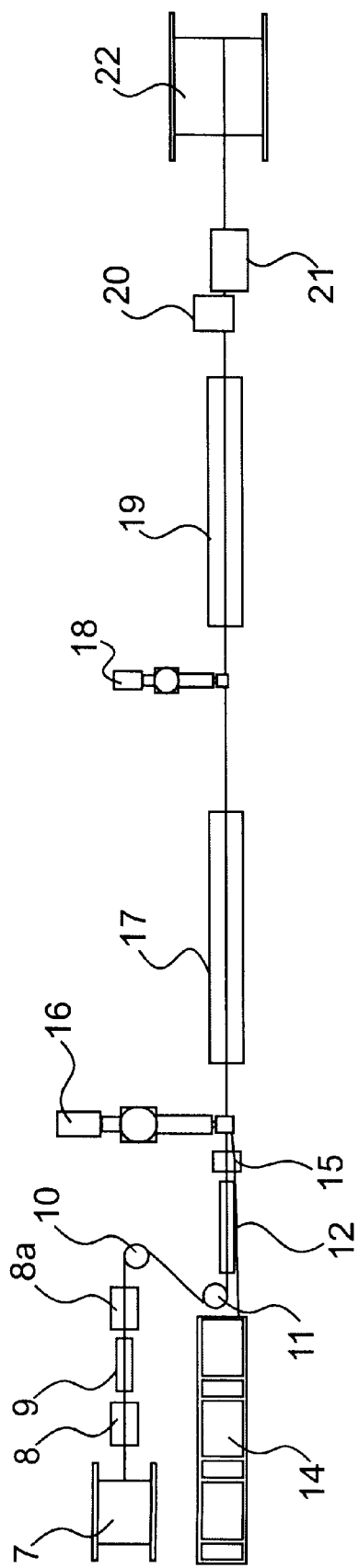
FIG. 3 shows a longitudinal schematic view of a line for the manufacture of an optical core in accordance with the invention.
Figure 4:
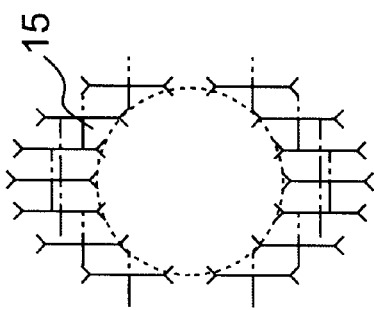
FIG. 4 shows a front view of the disposition of the turning pulleys of the optical fibres of the core.
Figure 5:
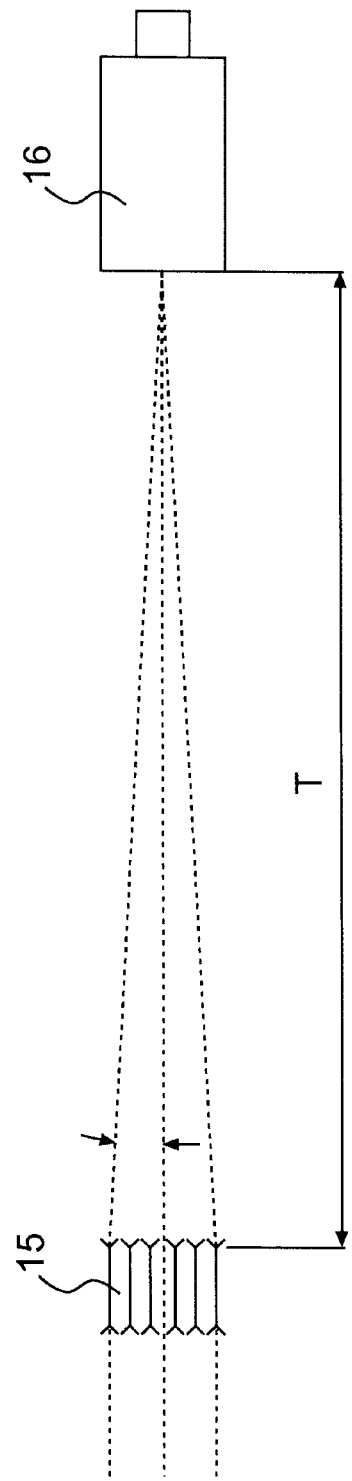
FIG. 5 shows a schematic plan of the path of the optical fibres between the turning pulleys and the extruder of the second thermoplastic layer of the optical core.

With reference to FIG. 3, a plan of the equipment for manufacture of the optical core comprises, in order, a drum 7 from which the central support 6 is unwound, one or more buffers 8, 8a and a braking member 9 for braking the support 6, one or more turning pulleys for conveying said support first through an infrared ray oven 12 for preheating, and then into the extruder 16. In parallel, the optical fibres 3 are unwound by optical fibre unwinding means 14 and conveyed into the extruder 16. A cooling tank 17 is placed at the exit of the extruder 16. According to a preferred embodiment, the optical core comprises 12 optical fibres guided into the extruder by appropriate pulleys 15. The pulleys, the disposition of which with respect to one another and to the longitudinal axis of the extruder is depicted in detail in FIGS. 4 and 5, are suitably braked and disposed at a suitable distance from the longitudinal axis passing through the centre of the extruder 16, so as to guide the fibres to the entrance of the extrusion head at a suitable angle a with respect to the longitudinal axis, this angle a being less than 3° preferably of about 1.5°. The distance "T" between the pulleys and the extruder may range from approximately 700 mm to approximately 1500 mm, being preferably approximately 1070 mm.

A further extruder 18 may optionally be placed after the cooling tank 17, for coating the optical core with a plastic sheath, with its own cooling tank 19 in turn placed after this extruder. Following the extruder and associated tank is a pulling member 20, followed by a buffer 21 and a collecting stand 22 for the finished optical core.

Figure 6:
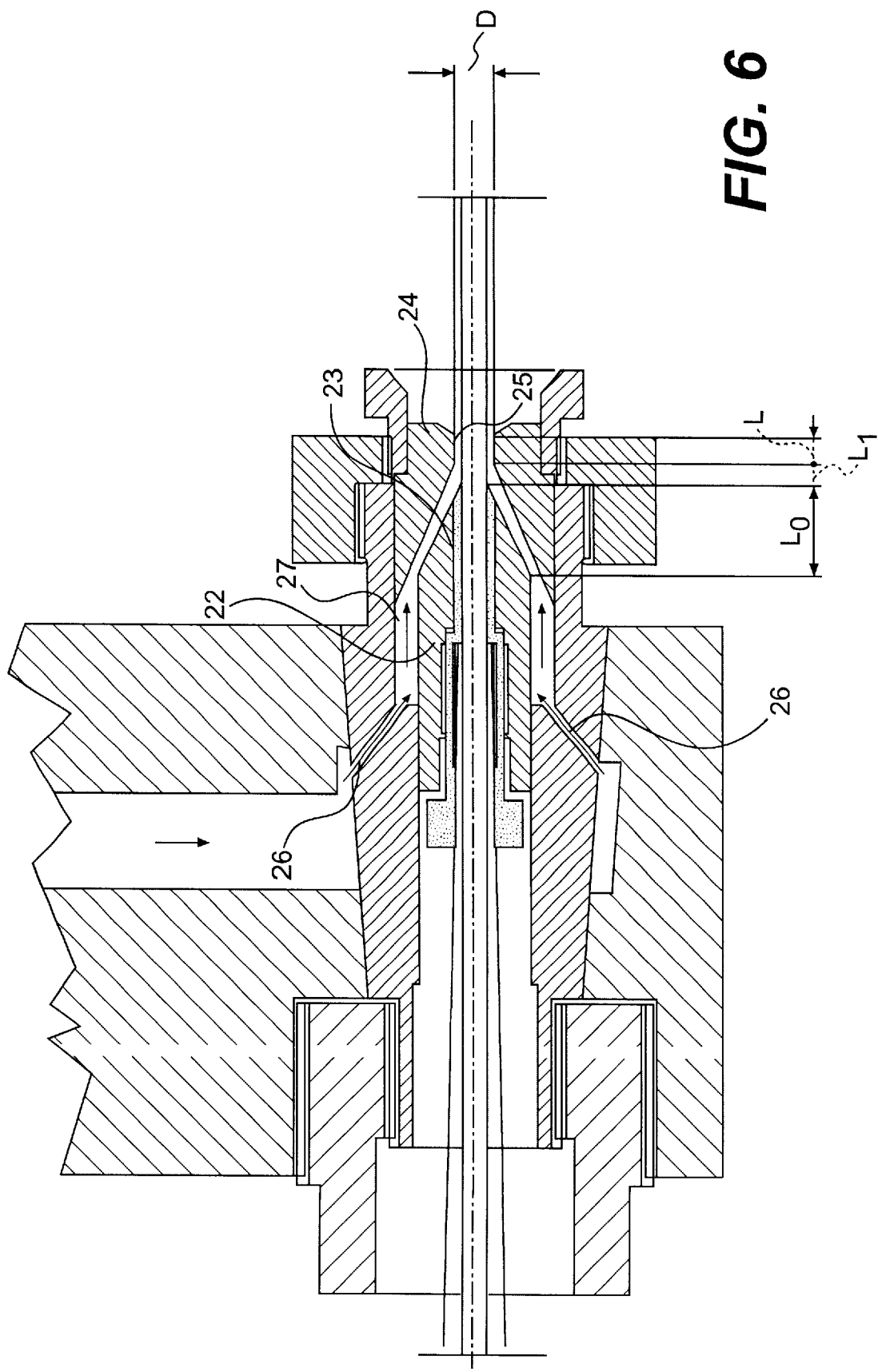
FIG. 6 shows a longitudinal section of the extruder of the second thermoplastic layer.

The extruder 16, illustrated in longitudinal schematic section in FIG. 6,: comprises a male die 22 through which the support and optical fibres are to be forced and which includes the part 23 (illustrated in detail in FIGS. 7–9) adapted to arrange the fibres in the desired configuration around the central support, a female die 24, comprising the land 25, and one or more channels 26 through which the molten polymeric material is first conveyed to the zone 27 bounded by the above-mentioned two dies, and then applied to the support and the fibres as they exit from the cavity of the part 23 of the male die and on to the zone of the land 25.

Preferably, the inner cavity of the part 23 of the male die varies gradually, as depicted by the chain line in FIG. 7, being determined by the two values for the transverse sections of entrance and exit shown in the FIGS. 8 and 9.

In greater detail, the inner cavity comprises a plurality of longitudinal grooves 28, 29, 28', 29' adapted for gradually guiding the optical fibres as they move through the extruder until they reach a position of substantial tangency between fibres and support at the exit of the male die. According to a preferred embodiment, the grooves are 12 in number.

In particular, the distance between the radially outermost walls of two diametrically opposite grooves 28, 29 has a first value "$P_1$" in the entrance section and a second value "$P_2$" less than the first, in the exit section, in relation to the grooves 28', 29'.

More specifically, the second value is predetermined so as to ensure that the optical fibres, at least at the exit of the structure, maintain a condition of substantial tangency to the support until the zone of extrusion of the second polymeric layer.

This condition is determined by the fact that the maximum distance "$P_2$" between the two diametrically opposite grooves 28' and 29' in the exit section of the tubular wall substantially corresponds to the sum of the external diameter of the support and twice the diameter of the fibres. In the case of a support having a diameter of 1.7 mm, and for fibres of diameter 0.25 mm, this distance will therefore be of about 2.2 mm.

The value "$P_1$" of the entrance section is fixed in relation to the length of the male die part 23 and to the angle a formed by the optical fibres with the longitudinal axis of the extruder, so as to maintain said angle a substantially constant in the inner cavity of the male die as well. For example, in the above case where the value of "$P_2$" is approximately 2.3 mm, for an angle a of approximately 1.50° and a male die of approximate length 10 mm, "$P_1$" will have a value of approximately 2.8 mm.

The land 25 of the female die is typically a 9 cylinder characterized by given values for the ratio of the length "L" to the diameter "D", typically of between 1 and 2 to 1.

In accordance with the quoted "L/D" ratio values, the length values "L" are between 2 and 6 mm and the diameter values "D" between 2 and 4 mm.

Preferably, the "L/D" ratio is between approximately 1.3 and 1.5 mm, where the preferred value is approximately 1.38. The length "L" of the land is preferably between 3 and 5 mm, where particular preference is for a length of approximately 4 mm. The diameter "D" is preferably between 2.2 and 3.6 mm respectively, with a particular preference for a diameter of approximately 2.9 mm.

The length $L_o$ is approximately 100 mm and the distance $L_1$ between the extremity of the male die and the land of the female die is between 1 mm and 4 mm, and preferably 2 mm.

The diameter of the inner wall of the male die ($P_3$), with respect to which the grooves are radially oriented, is of the same value in the entrance and exit sections of FIGS. 8 and 9, being slightly greater than the diameter of the support forced though it, typically 0.1 to 0.2 mm greater. For example, for a support having diameter 1.7 mm, a male die with an internal diameter of 1.8 mm will preferably be employed.

According to a preferred embodiment, the centres of the grooves of the entrance section are aligned on a circumference having a diameter $P_4$ of approximately 2.5 mm and the centres of the grooves of the exit section are aligned on a circumference having a diameter $P_5$ of approximately 2.0 mm.

The extrusion temperature of the second polymeric layer shall be such as not to negatively affect positioning of the optical fibres around the support. More specifically, the extrusion temperature shall be such as to ensure a sufficiently low viscosity of the polymer, to avoid the fibres being displaced from their relative positions, both in the axial direction and along the circumference. The extrusion temperature may thus be adjusted to have a polymer with a viscosity of about 680 Pa·s or lower, measured at a shear rate of 100 sec$^{-1}$, preferably lower than about 500 Pa·s, a viscosity of about 400 Pa·s being particularly preferred. For example, if Hytrel 4056 is used for the coating polymer, to obtain a polymer of sufficiently low viscosity, the extrusion temperature (measured at the exit of the dies) shall be at least 220° C. (viscosity of about 660 Pa·s; shear rate of 100 sec$^{-1}$), preferably at least about 240° C. (viscosity of about 450

Pa·s), a temperature of about 250° C. being particularly preferred (viscosity of about 370 Pa·s). Conversely, as excessive temperatures can cause decomposition of the material constituting the protective coating of the fibres, typically based on acrylates, the temperature is preferably maintained below 300° C., preferably below 280° C.

With reference to the figures, an example is described below of an embodiment of the optical core according to the invention, where an elastomeric polyester, more specifically Hytrel® (Du Pont) is used as the thermoplastic material for both coating layers.

The support, in this case a steel wire coated with a first layer of polymeric material, is moved at a constant line speed, of preferably between 10 and 50 m/min, and is braked with a predetermined braking value, typically between 1 and 5 kg.

According to an especially preferred embodiment, the line speed is 14 m/min and the support braking value is 2.5 kg.

Initially the support is taken into the preheating oven 12, preferably of infrared type, regulated at a temperature of between 600 and 900° C., preferably 750° C. approximately, so as to raise the support to a temperature of approximately 120–130° C. The temperature of this polymeric layer should be maintained at least 20° C., preferably at least about 30° C., below the melting temperature of the polymer. This allows to extrude the outer layer at a temperature sufficiently high to have the desired viscosity, without causing the melting of the inner layer and the consequent partial embedding of the fibers into said inner layer.

The preheated support is then fed to the centre of the unwinding means of the 12 pulleys bearing the optical fibres unwound by the traction they are subjected to and subject to a braking force, the values of which are correlated to those of the pull on the support and are between 50 and 250 g. To advantage, the ratio of the braking "K" on the support to the braking "k" on the fibres is between 10 and 50.

The "K/k" ratio values are conveniently predetermined so that, on release of the pull on the support and on the fibres, the residual elongation of the optical fibres that must be compensated for before they are subject to compression is at least equal to approximately 0.02%.

The fibres and the support are fed inside the male die 22 towards the zone of the land 25 where the second layer of polymeric material is extruded. The optical fibres are suitably guided in the tubular wall of the part 23 by the longitudinal grooves 28, 29 (FIGS. 7–9) forming radial containing surfaces for the fibres so that they first gradually approach the support and then assume thereupon the condition of substantial tangency at least until the male die exit point (FIG. 9) through the grooves 28', 29'.

The optical fibers exit from the male die 22 in the position of substantial tangency to the support and with the reciprocal circumferential separation configuration imposed by the longitudinal grooves, and move with the support to the land 25 of the female die 24, where they are coated with the second polymeric layer coming from the channel 27. The land 25 of the female die is characterized by the length and diameter values seen earlier.

Preferably, the temperature of the second polymeric layer, measured at the outlet of the dies, is between 220° C. and 2800° C., where the particularly preferred temperature is between 240° C. and 260° C., the most preferred temperature being 250° C.

At the extruder exit, in the case where the second polymeric layer is the last part of the optical core, the support with the fibres encapsulated in the polymeric layer moves into the cooling tank and then on to the collecting stage.

The core 6 is cooled in water at a predetermined temperature in the tank 11. In. particular, the Applicant has seen that, to maintain the optical fibres substantially tangential to the support, as desired, it is advantageous to cool the core to a temperature between and 80° C., and preferably between 40° C. and 60° C.

Where coating of the optical core with a further coating layer is envisaged, the support with the optical fibres encapsulated in the second layer moves through another extruder where it is coated with a thermoplastic sheath, of a polyamide resin for example.

The optical core, completed with the thermoplastic sheath, is then cooled in the tank as already seen.

Finally the resulting core moves, by way of the pulling member 20, through the buffer 21 and is gathered on the collecting stand 22.

Using the method described above, two optical cores were made, altering the length "L" of the land 25 of the female die, and keeping the other parameters constant.

In particular, for both of the optical cores of the example, the following materials were used:

central reinforcing member: steel, diameter 0.65
first coating layer, Hytrel® 4056, thickness 0.525 mm;
12 optical fibres (diameter 240 μm) coated with acrylic resin;
second coating layer: Hytrel® 4056, thickness 0.525 mm.

For the extrusion a Bandera® 30 extruder was used with an extrusion head characterized by the following parameters:

diameter $P_1$ the male die entrance: 2.8 mm
diameter $P_2$ at the male die exit: 2.3 mm
length $L_0$ of the male die: 100 mm
distance $L_1$ between male die and land of female die: 2 mm
diameter of land of female die: 2.9 mm
length L of land: 1 mm or 4 mm (see table)

The parameters of the extrusion line were as follows:
line speed: 14 m/min;
braking of optical fibres: 100 g;
braking of support: 2.5 or 6.0 kg (see table).

The extrusion temperature for the second layer of Hytrel®was set at 230° C.

The cooling tank was at about 150 mm from the extruder and temperature of the water was approximately 50° C. or 80° C. (see table).

Performance was verified under thermal cycles ranging between maximum and minimum values of respectively +60° C. and -30° C., simulating the extreme temperature values that the cable may be subjected to in its lifetime, as for example, during storage in the factory, loading, shipping, and laying in accordance with the following method:

the optical core, of minimum length 3 km, is wound on a drum and put in a climate chamber with forced air circulation;

the desired temperature is set, ensuring that the temperature heat conditions are reached by measuring the resistance in direct current of the central member (until the resistance. value measured becomes constant);

once the desired temperature has been reached, the optical core is left under these conditions for a minimum of 24 h;

attenuation of the signal transmitted by the fibre is assessed by measuring the backscattering with OTDR at a wavelength of 1550 nm; the measurements are made at both ends of the fibre, and the attenuation taken as the average of the two measurements;

the thermal cycle requires 6 measurements of attenuation, respectively at 60° C., 0° C., -20° C., -30° C., 60° C. and 20° C.

| "L" (mm) | B (kg) | T (° C.) | Attenuation (dB/km) measured at a temperature of (° C.) | | | | | |
|---|---|---|---|---|---|---|---|---|
| | | | +60 | 0 | −20 | −30 | +60 | +20 |
| 1 | 2.5 | 50 | 0.199 | 0.208 | 0.227 | 0.24 | 0.209 | 0.196 |
| 4 | 2.5 | 50 | 0.191 | 0.190 | 0.189 | 0.188 | 0.196 | 0.190 |
| 1 | 2.5 | 80 | 0.212 | 0.262 | 0.338 | 0.354 | 0.223 | 0.218 |
| 4 | 2.5 | 80 | 0.199 | 0.192 | 0.192 | 0.192 | 0.200 | 0.193 |
| 1 | 6.0 | 50 | 0.224 | 0.282 | 0.341 | 0.360 | 0.241 | 0.232 |
| 4 | 6.0 | 50 | 0.200 | 0.191 | 0.194 | 0.196 | 0.198 | 0.193 |

L = Length of land of extrusion die
B = Braking of support
T = Temperature of cooling water The results shown in the table illustrate an improvement in the attenuation values obtainable in the optical fibres of the optical core when using an extrusion head for the second layer of Hytrel® having a land length "L" of 4 mm as against the attenuation values obtainable with the 1 mm value, all other dimensions of the extrusion head remaining equal.

More particularly, it should be observed that the average attenuation value measured for the fibres in cores according to the invention is in any case always less than or equal to 0.200 dB/km. Furthermore, the difference between the maximum and minimum average values measured during the thermal cycle is less than 0.01 dB/km.

As observed by the Applicant, the process according to the invention enables minimization of the mechanical pressures produced on the fibres during manufacture of the optical core. The advantage of this is that the substantial absence of external mechanical pressures exerted on the optical fibres, and control of the pressure of the polymeric material flowing in plastic form through the extrusion head, automatically means that the characteristics of the optical fibres will be upheld and that, as a result, there will be a reduction of the causes normally liable to produce attenuation of the optical signal transmitted by the fibres.

More particularly, as observed by the Applicant, the condition of substantial tangency is advantageously obtained by guiding the fibres in special grooves and maintaining the condition of substantial tangency during extrusion of the second polymeric layer, thereby also avoiding substantial displacements of the fibres around the support. It was observed in particular that this condition may be achieved using a suitable value for the ratio of axial length "L" of the land of the female die to its diameter "D", preferably also adopting a given extrusion temperature value.

For example, excessively high values for the "L/D" ratio (due for instance to land lengths that are too long in relation to the diameter) can increase pressure of the polymeric material inside the extrusion head to such an extent that the fibres are moved from the desired configuration of tangency and of separation around the circumference. On the other hand, too low an extrusion temperature can also result in this drawback, on account of excessive viscosity of the polymer. It was also observed that if the "L/D" ratio is too low (for instance, due to insufficient lengths relative to the diameter), only partial or non-uniform coating of the optical fibres may result, typically on account of too rapid a variation in the pressure of the polymeric material moving out of the extrusion head and into the surrounding environment.

The Applicant has also observed that setting the temperature of the cooling tank at a value of at least 20 ° C. also helps maintain the required degree of coating on the fibres. The reason for this is that keeping the cooling water temperature above this value avoids potential over-cooling of the outermost part of the core compared with the innermost part, with resultant contraction of the external part.

In a situation such as this, it may happen that the plastic material disposed around the optical fibres is drawn outwardly to compensate for the volume of material missing following contraction of the external part. This produces a consequent displacement of the optical fibres from their orderly geometrical configuration, which may result in localized excesses of pressure on the fibres and consequent attenuation of the signal transmitted by the fibre.

The present invention is not strictly limited to what has been described in the foregoing but also includes all those solutions and construction alternatives which, even if not expressly described, those skilled in the art will find easy to infer from the invention as described, and which do not involve any substantial radial pressure of the fibre on the central support.

For example, the optical fibres could be applied to the support in an "SZ" type configuration instead of parallel to the longitudinal central axis of the core.

According to a possible variant of the process according to the invention, the "SZ" configuration may be produced by alternate rotations of the fibres by using a male die rotating in opposite directions, or again for example by causing oscillations of the central wire before the extrusion head.

The optical core of the invention may be part of, for example, an underwater telecommunications cable further comprising the following elements:

a tensile stress resistant reinforcing element, typically comprising one or more rings of steel wires;
  a watertight sheath soldered longitudinally (of copper, for example), optionally acting as an electrical conductor in the case of cables for repeater or amplifier systems;
  padding on the optical module and between the reinforcing wires to avoid longitudinal penetration of water, using substances of suitable viscosity, preferably expanding with humidity and accepting hydrogen;
  an outer insulating sheath, of polyethylene for example;
  where necessary, depending on the depth the cable is laid at, a protective armouring.

The optical core according to the invention may be used to advantage in other cable structure applications, Isuch as for example terrestrial cables, safety ropes and similar, in combination with the specific reinforcing and/or functional elements envisaged for each application.

What is claimed is:

1. Process for the manufacture of an optical core for a telecommunications cable, comprising at least one central support with a first polymeric coating layer, a plurality of optical fibres arranged longitudinally around the support and a second polymeric coating layer extruded around said first polymeric layer and around said optical fibres, which comprises the steps of:

a) arranging said optical fibres longitudinally around said first polymeric coating layer so that the optical fibres are substantially tangential to the surface of said coating and circumferentially separated from each other in a predetermined way;
  b) extruding the second polymeric layer around said first layer and around said optical fibres, maintaining a condition of substantial tangency and circumferential separation at least as far as the exit of the extruder,
  wherein the temperature of the first polymeric layer is kept at least 30° C. below the melting temperature of the polymer before extruding the second polymeric layer on it, and said second layer is extruded at a temperature sufficiently high such that the polymer material of said second layer has a viscosity lower than a predetermined value, so to avoid the fibres from being displaced from their relative positions, both in the axial direction and along the circumference.

2. Process according to claim 1, wherein said second layer is extruded at a temperature at which said polymer has a viscosity of about 680 Pa·s or lower, measured at a shear rate of 100 sec$^{-1}$.

3. Process according to claim 1, wherein said second layer is extruded at a temperature at which said polymer has a viscosity lower than about 500 Pa·s.

4. Process according to claim 1, wherein said second layer is extruded at a temperature at which said polymer has a viscosity of about 400 Pa·s.

5. Process according to claim 1, wherein said temperature of said second layer is at least 220° C. or higher.

6. Process according to claim 1, wherein said temperature of said second layer is from 220° C. to 280° C.

7. Process according to claim 2, wherein said extruder comprises a female die a having a "land" with predetermined values for length "L" and diameter "D", such as to substantially maintain a condition of substantial tangency between the fibres and the support and of relative circumferential: separation as far as the exit from the zone of extrusion of the second polymeric layer.

8. Process according to claim 7, wherein the "LD" ratio values are between 1 and 2.

9. Process according to claim 7, wherein the "LD" ratio values are between 1.3 and 1.5.

10. Process according to claim 7, wherein the length "L" of the land is between 2 and 6 mm and the diameter "D" is between 2 and 4 mm.

11. Process according to claim 7, wherein the length "L" of the land is between 3 and 5 mm and the diameter "D" is between 2.2 and 3.6 mm.

12. Process according to claim 2, wherein an, extrusion head on said extruder comprises a male die comprising a plurality of grooves suitably arranged longitudinally along the inner wall of said male die so as to guide and maintain the optical fibres in the position of substantial tangency to the support.

13. Process according to claim 12, wherein the grooves are arranged so that the maximum distance between two opposite grooves, close to the exit of the male die, substantially corresponds to the sum of the diameter of the support and of twice the diameter of the fibres.

14. Process according to claim 1, wherein the optical core is cooled after extrusion in a cooling tank containing water at a temperature between approximately 20° C. and approximately 80° C.

15. Process according to claim 1, wherein the optical core is collected on a fibre of between 10 and 50, the values of said ratio being such that upon release of said pulls "K" and "k" the residual fibre elongation that must be compensated for before the fibres are subject to compression, is at least about 0.02%.

16. Process according to claim 1, wherein the support has a feed rate between 10and 50 m/min.

* * * * *

UNITED STATES PATENT AND TRADEMARK OFFICE
CERTIFICATE OF CORRECTION

PATENT NO. : 6,500,365 B1
DATED : December 31, 2002
INVENTOR(S) : Cecchi et al.

It is certified that error appears in the above-identified patent and that said Letters Patent is hereby corrected as shown below:

Column 12,
Line 60, "way;" should read -- way; and --.

Column 13,
Lines 25-26, "circumferential:" should read -- circumferential --.
Lines 28 and 30, "LD" should read -- L/D --.

Column 14,
Line 29, "10and" should read -- 10 and --.

Signed and Sealed this

Twenty-ninth Day of April, 2003

JAMES E. ROGAN
*Director of the United States Patent and Trademark Office*